United States Patent [19]
Sakamoto et al.

[11] Patent Number: 5,193,407
[45] Date of Patent: Mar. 16, 1993

[54] SHOCK DETECTING DEVICE

[75] Inventors: Kazunori Sakamoto, Chiryu; Masanobu Ishikawa, Nagoya; Yutaka Kondoh, Toyota, all of Japan

[73] Assignee: Aisin Seiki Kabushi Kaisha, Aichi, Japan

[21] Appl. No.: 802,530

[22] Filed: Dec. 5, 1991

[30] Foreign Application Priority Data

Dec. 7, 1990 [JP] Japan ................... 2-400187
Mar. 29, 1991 [JP] Japan ................... 3-65942

[51] Int. Cl.$^5$ .................. B23Q 11/16; F16H 5/40
[52] U.S. Cl. .................... 74/2; 280/734; 180/282; 102/252
[58] Field of Search .............. 74/2; 280/734; 180/282; 102/252

[56] References Cited

U.S. PATENT DOCUMENTS

| | | | |
|---|---|---|---|
| 4,889,068 | 12/1989 | Tabata et al. | 102/252 X |
| 5,024,157 | 6/1991 | Nishikawa | 102/252 |

FOREIGN PATENT DOCUMENTS

| | | | |
|---|---|---|---|
| 2559584 | 8/1985 | France | 280/734 |
| 249744 | 10/1990 | Japan | |

Primary Examiner—Dirk Wright
Attorney, Agent, or Firm—Finnegan, Henderson, Farabow, Garrett and Dunner

[57] ABSTRACT

A hole 13 though which a firing pin 6a of a firing lever 6 is projected outside a housing 1 is formed in a wall 1c of the housing which is in parallel with a direction of an external shock applied to the housing 1. This structure ensures the rotational angle of the firing lever 6 and a biasing force of a spring 9 which urges the firing lever 6 can be used effectively as kinetic energy thereof.

3 Claims, 3 Drawing Sheets 5,193,407

SHOCK DETECTING DEVICE

BACKGROUND OF THE INVENTION

The present invention relates to a shock detecting device, and in particular, to a shock detecting device for igniting an ignition element without using electric power.

A shock detecting device is used as a sensor which is set to initiate an anti-shock safety device such as an air bag or a seat-belt tensioner. The conventional shock detecting device is disclosed, for example, in Japanese Patent Laid-open Print No. 249744/ 2nd year of Heisei (1990) which was published in 1990 without examination. In the conventional device, a weight is set to be rotated upon receipt of a shock whose magnitude is above a set value. Due to the resultant rotation of the weight, a firing lever is released from a cam portion of the weight which is biased by a spring, thereby rotating the firing lever. Thus, a firing pin formed integrally with the firing lever is extended outside a housing through a hole formed in a wall of the housing which is perpendicular to the direction of the application of the shock so that an ignition element such as a percussion element is struck.

However, in the foregoing structure, since the firing pin is set to be extended in the opposite direction of the shock, the rotation of the firing lever is too small; and the biasing force of the spring is not effectively transformed into kinetic energy of the firing pin.

SUMMARY OF THE INVENTION

It is, therefore, a principal object of the present invention to provide a shock detecting device without the foregoing drawbacks.

It is another object of the present invention to provide a shock detecting device in which a biasing force can be used effectively as the kinetic energy of a firing pin.

In order to attain the foregoing objects, a shock detecting device in accordance with the present invention is comprised of a housing having a side wall for receiving an external shock and a bottom wall having a hole therethrough perpendicular to the side wall, a bracket accommodated within the housing and secured thereto, a weight having a first shaft coaxially therewith and supported on the bracket so as to be rotated when a second external shock exceeds a set value, a cam portion provided on the shaft, a firing lever accommodated within the housing and pivoted on the shaft which is connected to the housing so as to be parallel to the first shaft, a spring mounted on the second shaft and biasing the firing lever in one direction so as to engage the firing lever with the cam portion, a stopper pin provided on the weight and engaged with the bracket by the biasing force of the spring which is applied to the cam portion of the first shaft, and a firing pin provided on the firing lever and set to be rotated in one direction so as to be projected outside the housing through the hole upon release of the firing lever from the cam portion as a result of the external shock.

DETAILED DESCRIPTION OF THE INVENTION

Figure 1:
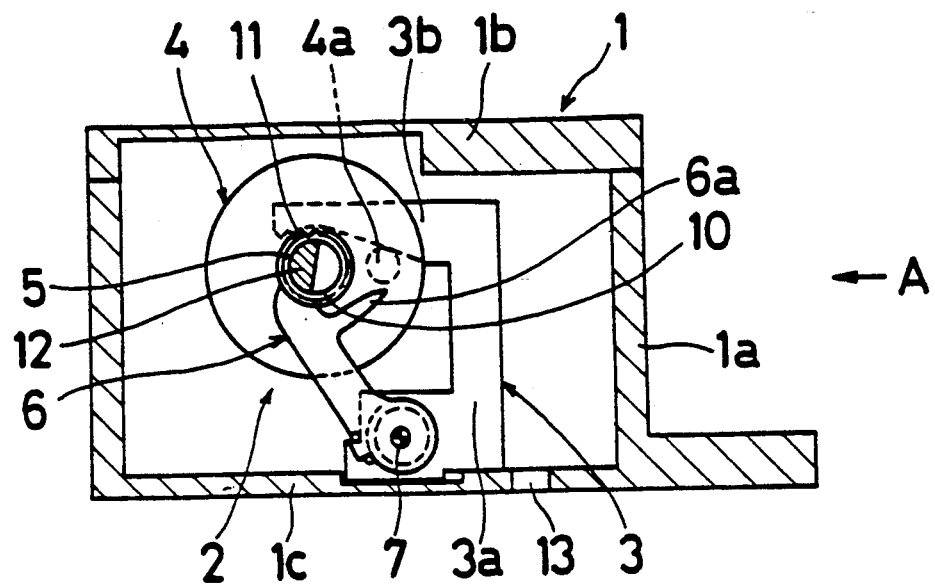
FIG. 1 is a vertical cross sectional view of a shock detecting device of one embodiment according to the present invention.
Figure 2:
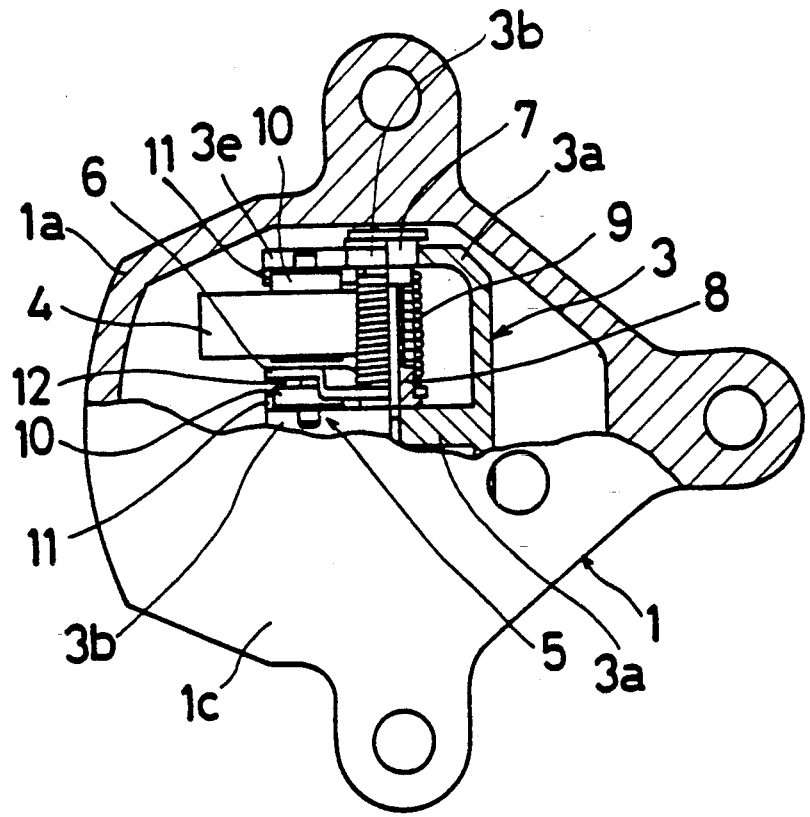
FIG. 2 is a plan view partly broken away to show a sectional view of the shock detecting device.

Referring now to FIGS. 1 and 2, a housing 1 of a shock detecting device according to the present invention includes a main body 1a in the form of a container whose top and portion is opened and a plate 1b for closing or covering the opening, within the inner space of the housing 1, a shock detecting mechanism 2 is accommodated.

Figure 3:
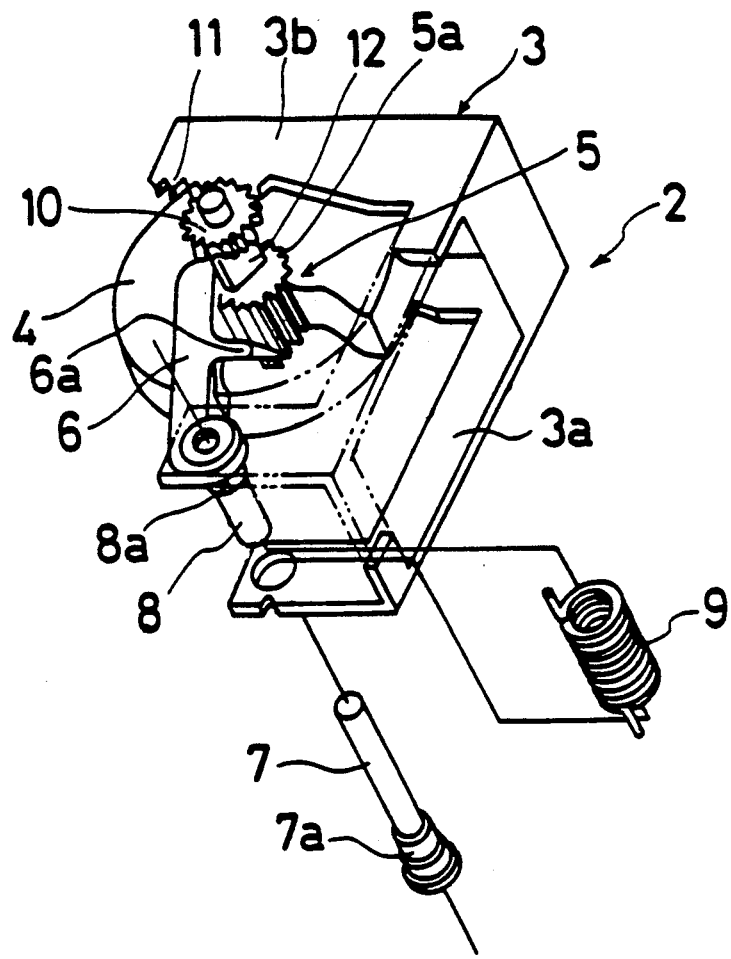
FIG. 3 is the perspective exploded view of a shock detecting mechanism.

As shown in FIGS. 1 through 3, within the housing 1, there is installed a bracket 3 at an intermediate portion between the plate 1b and a bottom wall 1c of the housing 1. The bracket 3, which is formed from one metal sheet by bending, has a pair of opposed supporting portions 3a each of which is of an L-shape, a pair of opposed flange portions 3b each of which extends from an upper end of the corresponding supporting portion 3a with making an angle of 90 degrees relative thereto, and a connecting portion for connecting the upper end portions of both supporting portions 3a. The bracket 3 is secured or fixed at its supporting portions 3a to the bottom wall 1c.

A weight 4 which is in the form of an annular member is secured coaxially to a geared portion 5a (see FIG. 3) of a shaft 5 so as to be movable therewith. The weight 4 is provided thereon with a stopper pin 4a which is in engagement with each flange portion 3b of the bracket 3 and this engagement sets an initial position of the weight 4 within the housing 1. It is noted that both ends of the shaft 5 are in sliding engagement with grooves 3a each of which is formed in the flange portion 3b. Thus, the weight is movable along grooves 3a and is also rotatable relative to the bracket 3.

Figure 4:
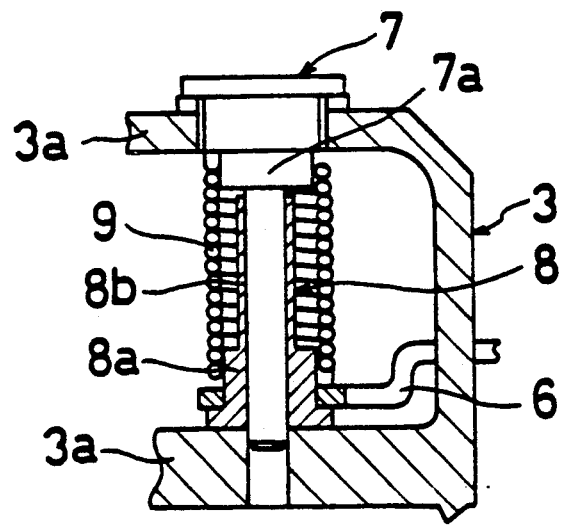
FIG. 4 is a fragmentary cross sectional view of the shock detecting device showing a portion in the neighborhood of a firing lever.

A firing lever 6 is rotatably mounted, via a bush or collar 8 (FIG. 3), on a pin 7 which is secured at its ends to the supporting portions 3a. As best shown in FIG. 4, a torsion spring 9 is arranged around the collar 8 in such a manner that one end of the torsion spring 9 is secured to one of the supporting portions 3a and the other end is secured to the firing lever 6, thereby biasing the firing lever 6 continuously in the clockwise direction in FIG. 1. As shown in FIGS. 3 and 4, the pin 7 and the collar 8 are formed with a stepped portion 7a and a stepped portion 8a, respectively, both of which are in opposition. The stepped portion 7a is used for supporting one end of the torsion spring 9 and the stepped portion 8a is used for supporting the other end of the torsion spring 9 and the firing lever 6.

A main portion 8b of the collar 8 is smaller than the stepped portion 8a in radius and a clearance is set to be defined between the main portion 8b and the torsion spring 9. As apparent from FIGS. 1 and 2, the firing lever 6 is formed with a firing pin 6a, which is set to be projected outside housing 1 through a hole 13 formed in the bottom wall 13 upon rotation of the firing lever 6 as will be detailed.

As illustrated in FIGS. 1 through 3, a pinion gear 10 is fixedly mounted on the shaft 5 near its one end portion and a rack gear 11 which is in mesh engagement with the pinion gear 10 is formed on one of the flange portion 3b of the bracket 3. A cam portion 12 in a semi-circular shape in cross-section is formed on the shaft 5, which is detachably engaged with the firing lever 6, so as to be adjacent to the pinion gear 10.

The structure as mentioned above is obtained after the following assembly processes. An engagement of the pinion gear 10 with the rack gear 11 is established under an initial condition that the stopper pin 4a is in abutment with the flange portion 3b after the mounting of the weight 4 on the shaft 5. Then, the firing lever 6 and the torsion spring 9 are supported on the collar 8, the resultant collar 8 is located between the supporting portions 3a, and thus located collar 8 is secured to the bracket 3 by the pin 7 secured to the supporting portion 3a after passing through the collar 8. Simultaneous to this fixing of the collar 8 to the bracket 3, an engagement of the firing lever 6 with the cam portion 12 of the shaft 5 is made. Thus, the bracket 3 in the form of a unit including the weight 4 and the firing lever 6 is formed. After this, the resultant bracket 3 is fixedly mounted to the housing 1, thereby competing the accommodation of the shock detecting mechanism 2 within the housing 1.

As mentioned above, the firing lever 6, the pinion gear 10, the lack gear 11 and the weight 4 are assembled in the bracket 3 as one unit independent from the housing 1. This serves for the effective assembly of the whole device. In addition, the bracket 3 per se is obtained from one metal sheet, which ensures the correct relationship between two any adjacent members without unexpected error. Thus, stable condition of the shock detecting device can be obtained.

An operation of the foregoing structure or construction of the shock detecting device will be detailed hereinafter.

Under the initial condition shown in FIG. 1, the cam portion 12 of the shaft 5 is in engagement with the firing lever 6, the weight 4 is in its initial state wherein the stopper pin 4a is in engagement with the flange portion 3b by the torsion spring 9, and the firing lever 6 is kept or held at its initial position by the foregoing engagement with the cam portion 12 despite the application of the biasing force of the torsion spring 9 on the firing lever 6.

Figure 5:
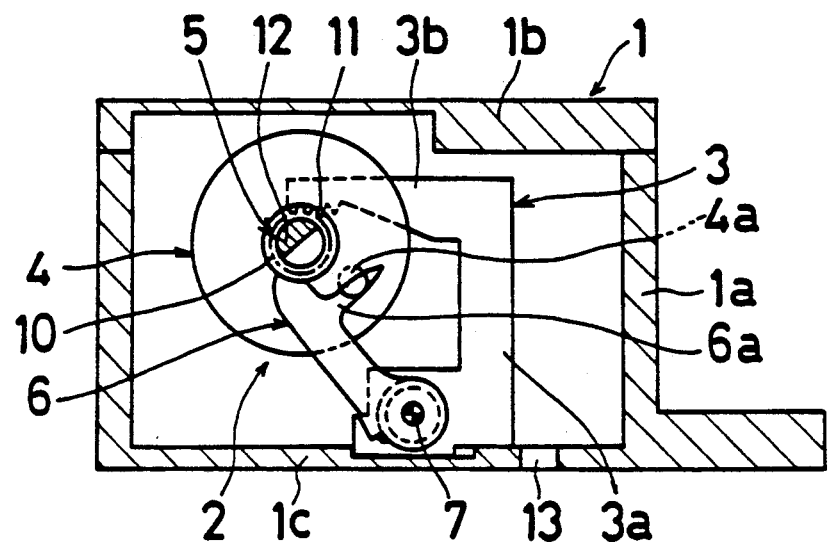
FIG. 5 a non-filed operation condition of the shock detecting mechanism.
Figure 6:
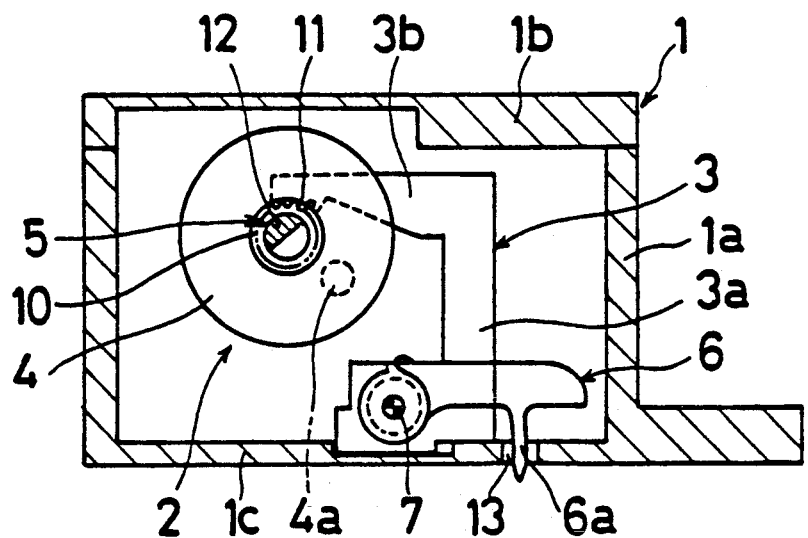
FIG. 6 shows a fired operating condition of the shock detecting device.

Under the above-mentioned condition, when an external shock is applied to the housing 1 in a direction of an arrow indicated by "A" as shown in FIG. 1 due to the collision of vehicles or collision of a vehicle with an object, the shock is detected by the weight 4. Then, as shown in FIG. 5, the weight 4 is moved along the rack gear 11 and each groove 3e by rotating in the clockwise direction against the biasing force of the torsion spring 9, resulting in the firing lever 6 being released from the cam portion 12. Thus, as shown in FIG. 6, the firing lever 6 is biased in the clockwise direction as a result of the biasing force of the torsion spring 9 which is being applied to the firing lever 6 and is brought into extension outside the housing 1 through the hole 13, thereby striking the percussion cap.

In the foregoing embodiment, the holding of the weight under the initial condition and the rotation and the biasing of the firing lever 6 can be established by the common torsion spring 9. This enables the obtaining of large energy despite the narrow space for accommodating the source thereof and the decrease of components in number, thereby establishing the miniaturization of the shock detecting device itself. Furthermore, the weight is of larger diameter, by which a large moment of inertia can be obtained, thereby preventing the instantaneous detection of the shock during the vehicle's travel on a bad road. Thus, no danger of the unexpected initiation of the shock detecting device is established, which leads to the improvement of the device in reliability.

In addition, since the projecting direction of the firing pin 6a is substantially perpendicular to the direction of the application of the shock, the rotating angle or the circumferential travel of the firing lever 6 can be set to be large, thereby enabling the effective use of the biasing force of the torsion spring 9 as the kinetic energy of the firing pin 6a. This means that the ignition of the percussion cap can't be initiated so long as the strike energy does not reach a set high value. In other words, high reliability in the ignition of the percussion cap can be obtained.

Furthermore, due to the clearance between the collar 8 and the torsion spring 9, the frictional loss therebetween can be decreased, thereby stably holding the weight under the initial condition, and decreasing the loss of the kinetic energy of the firing pin 6a, thus improving the reliability of the ignition of the percussion cap.

Although only one embodiment of the present invention has been disclosed and described, it is apparent that other embodiments and modifications of the present invention are possible without departing from the coverage of the attached claims.

What is claimed is:

1. A shock detecting device comprising:
    a housing having a side wall for receiving an external shock and a bottom wall having a hole therethrough perpendicular to the side wall;
    a bracket accommodated within the housing and secured thereto;
    a weight having a first shaft secured coaxially thereto and supported on the bracket so as to be rotated at times when the external shock exceeds a set value;
    a cam portion provided on the first shaft;
    a second shaft connected to the housing and disposed substantially parallel to the first shaft;
    a firing lever pivotally mounted within the housing on the second shaft;
    a spring mounted on the second shaft and biasing the firing lever in one direction to engage the cam portion;
    the weight having a stopper pin in engagement with the bracket by the biasing force of the spring applied to the cam portion of the first shaft; and
    a firing pin provided on the firing lever and rotatable in one direction to project outside the housing through the hole upon release of the firing lever from the cam portion in response to the external shock.

2. A shock detecting device in accordance with claim 1, wherein the cam portion is semi-circular in cross section.

3. A shock detecting device in accordance with claim 1, wherein the weight, the first and second shafts, the firing lever, the firing pin, and the spring are mounted to the bracket to constitute a unitary assembly independent of the housing; and means fixedly mounting the bracket in the housing.

* * * * *